March 24, 1953 T. WILSON ET AL 2,632,232
FLYING HOT SAW
Filed Nov. 12, 1947 11 Sheets-Sheet 1
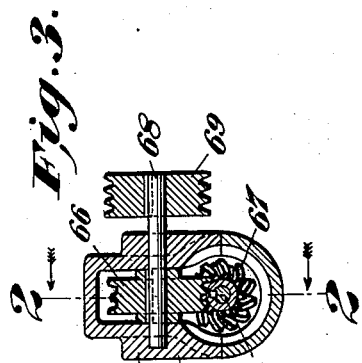
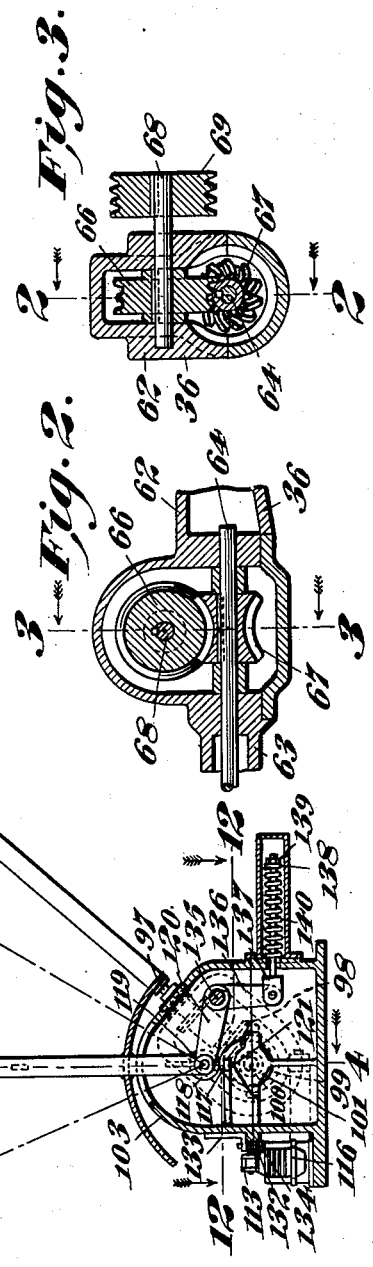
Inventors
Tom Wilson
and Lawrence J. Hess.
By R. S. A. Dougherty.
Attorney

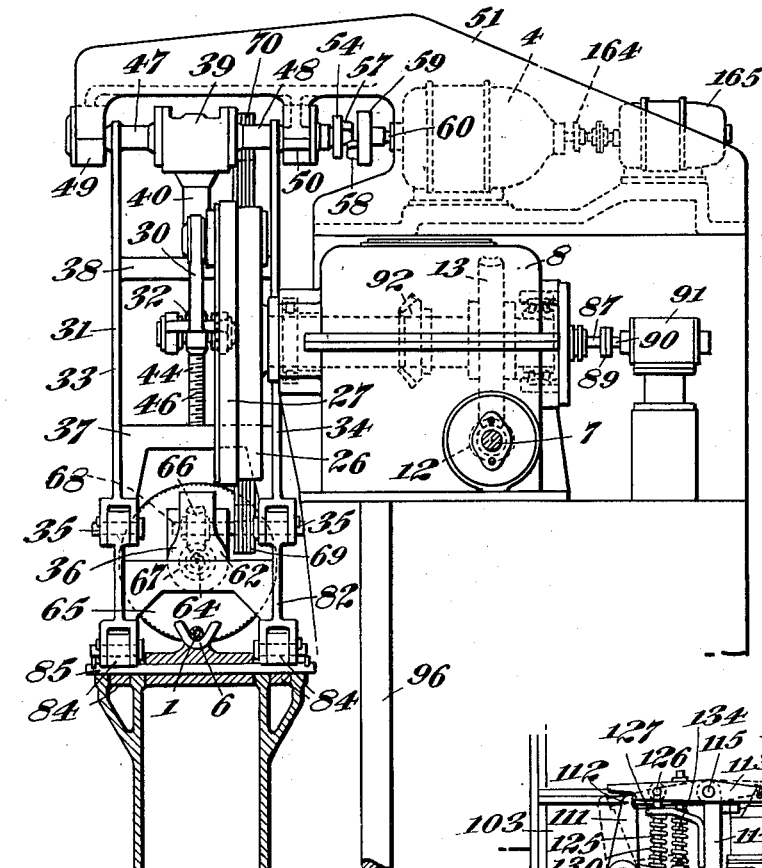
Fig. 4.
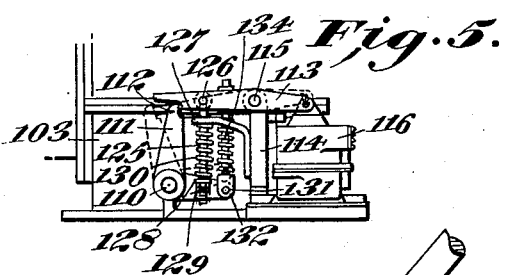
Fig. 5.
Fig. 6.
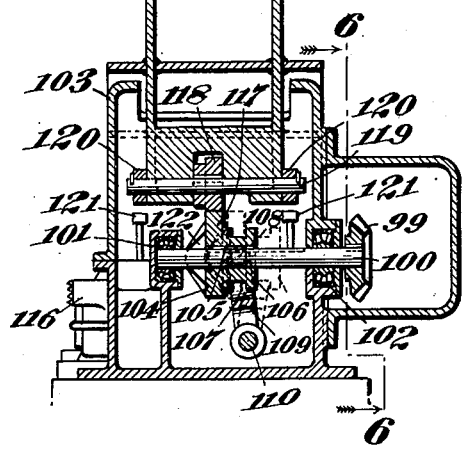
Inventors
Tom Wilson
and Lawrence J. Hess
By R. S. A. Dougherty
Attorney

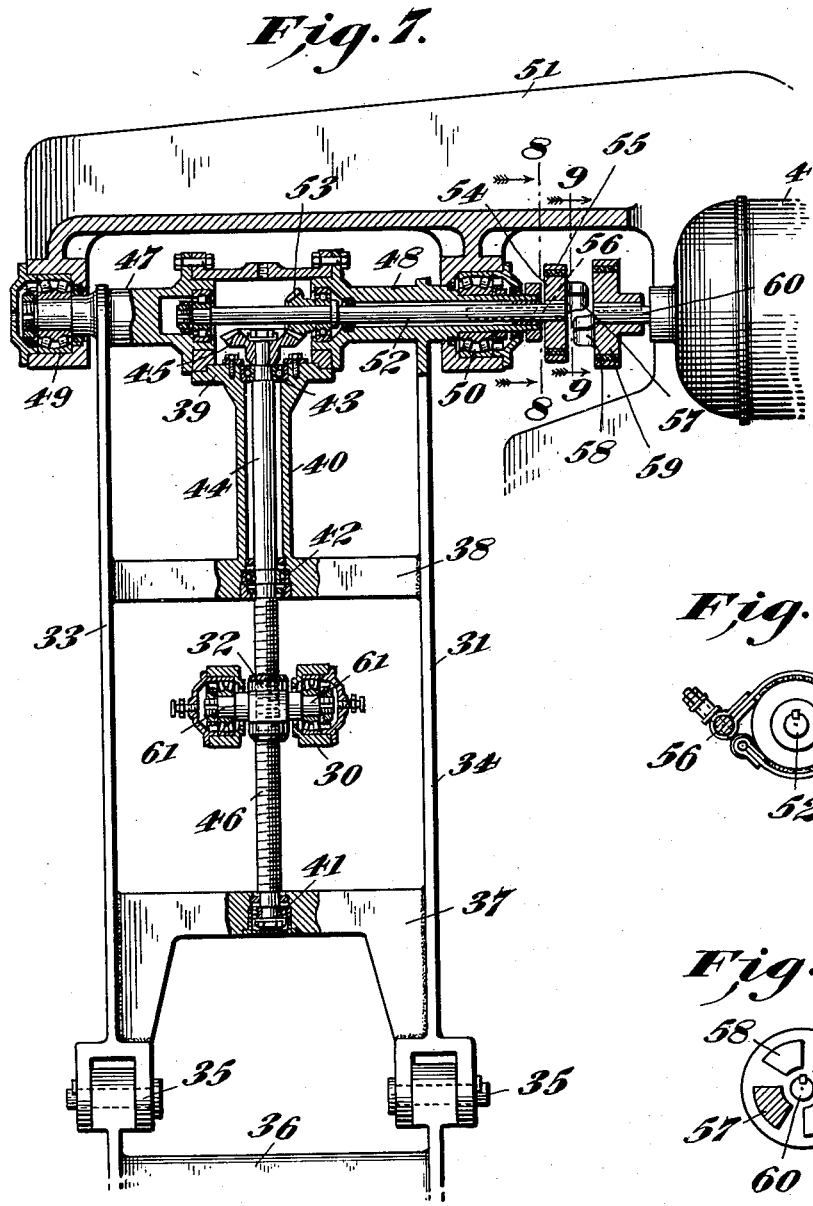

March 24, 1953 T. WILSON ET AL 2,632,232
FLYING HOT SAW
Filed Nov. 12, 1947 11 Sheets-Sheet 4
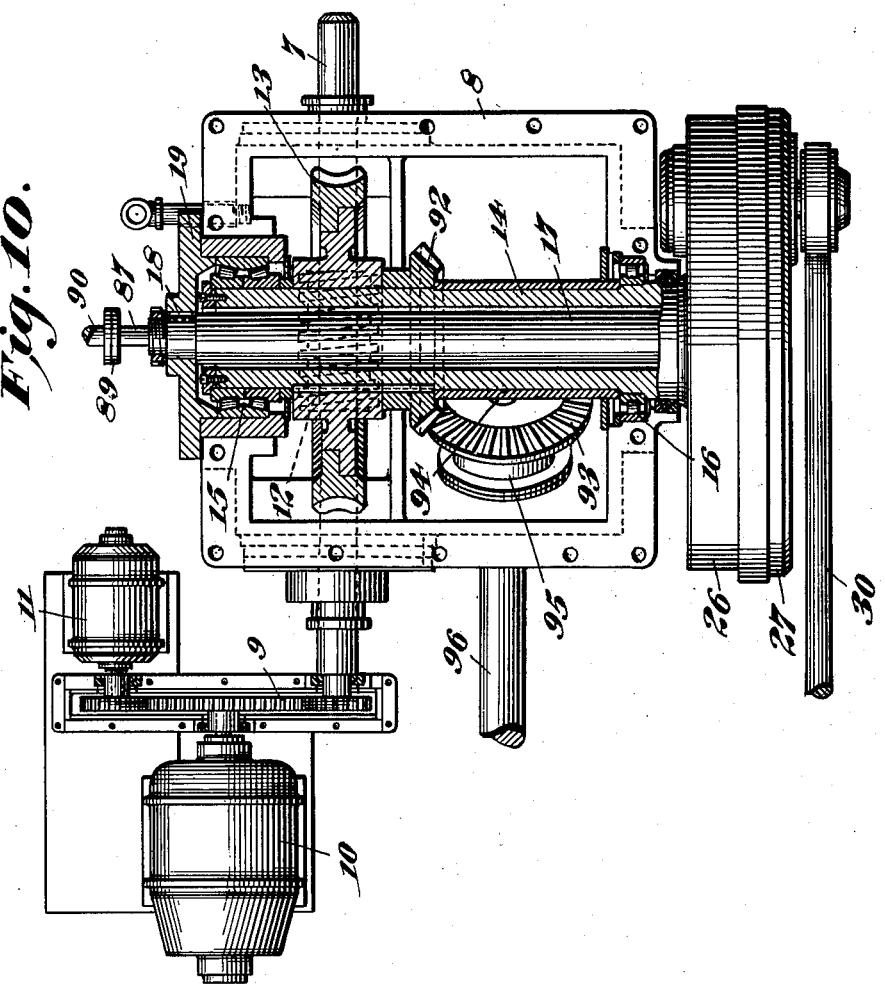
Inventors
Tom Wilson and
Lawrence J. Hess.
By R. S. C. Dougherty.
Attorney March 24, 1953

T. WILSON ET AL 2,632,232

FLYING HOT SAW

Filed Nov. 12, 1947

Inventors
Tom Wilson
and Lawrence J. Hess.
By R. S. A. Dougherty.
Attorney

March 24, 1953 T. WILSON ET AL 2,632,232
FLYING HOT SAW
Filed Nov. 12, 1947 11 Sheets-Sheet 6

Inventors
Tom Wilson and
Lawrence J. Hess.
By R. S. A. Dougherty
Attorney

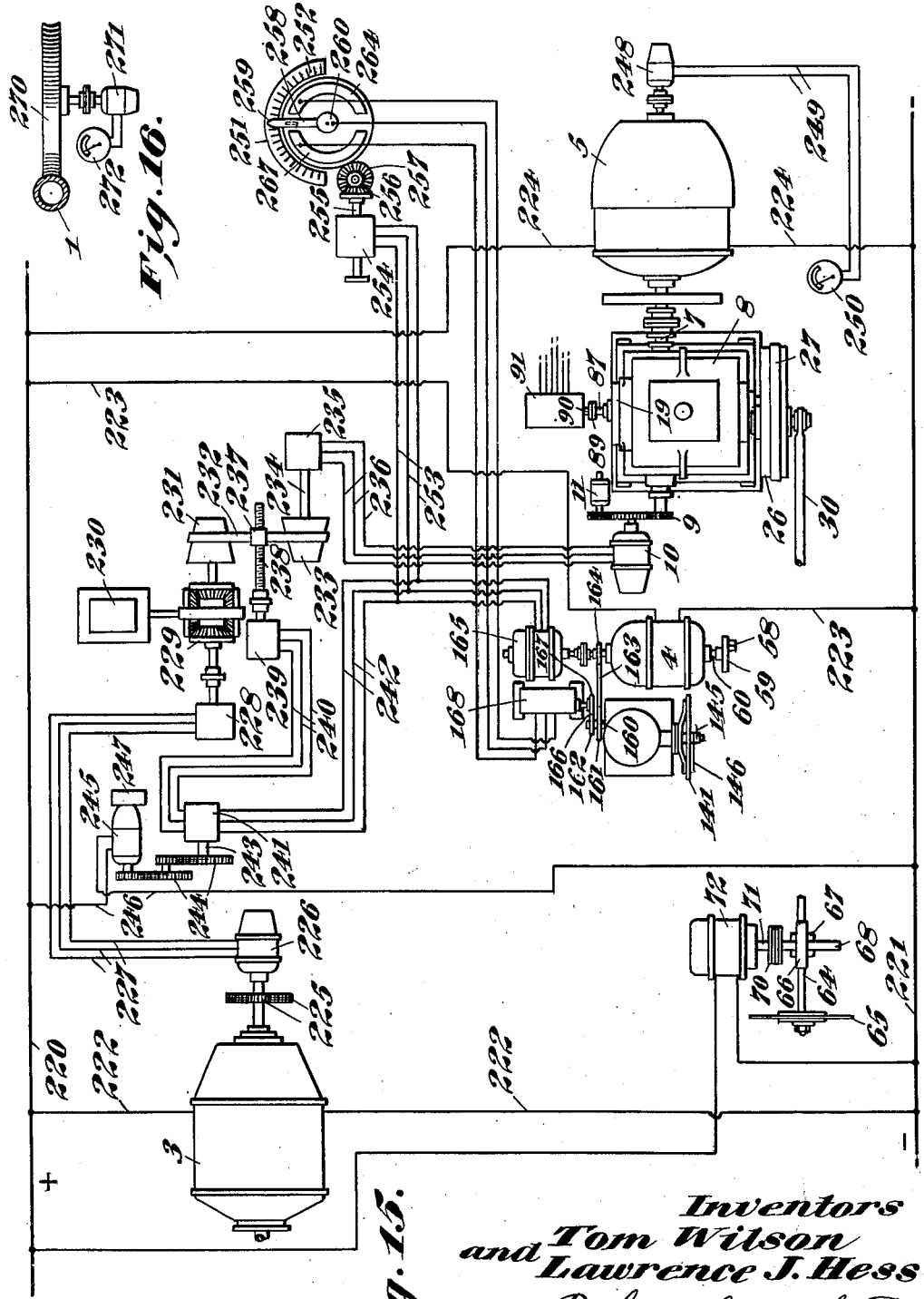

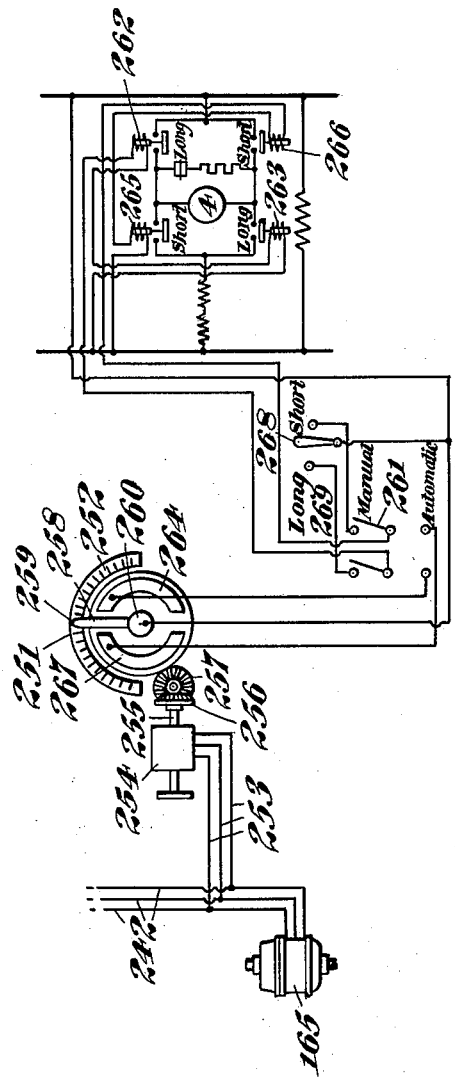

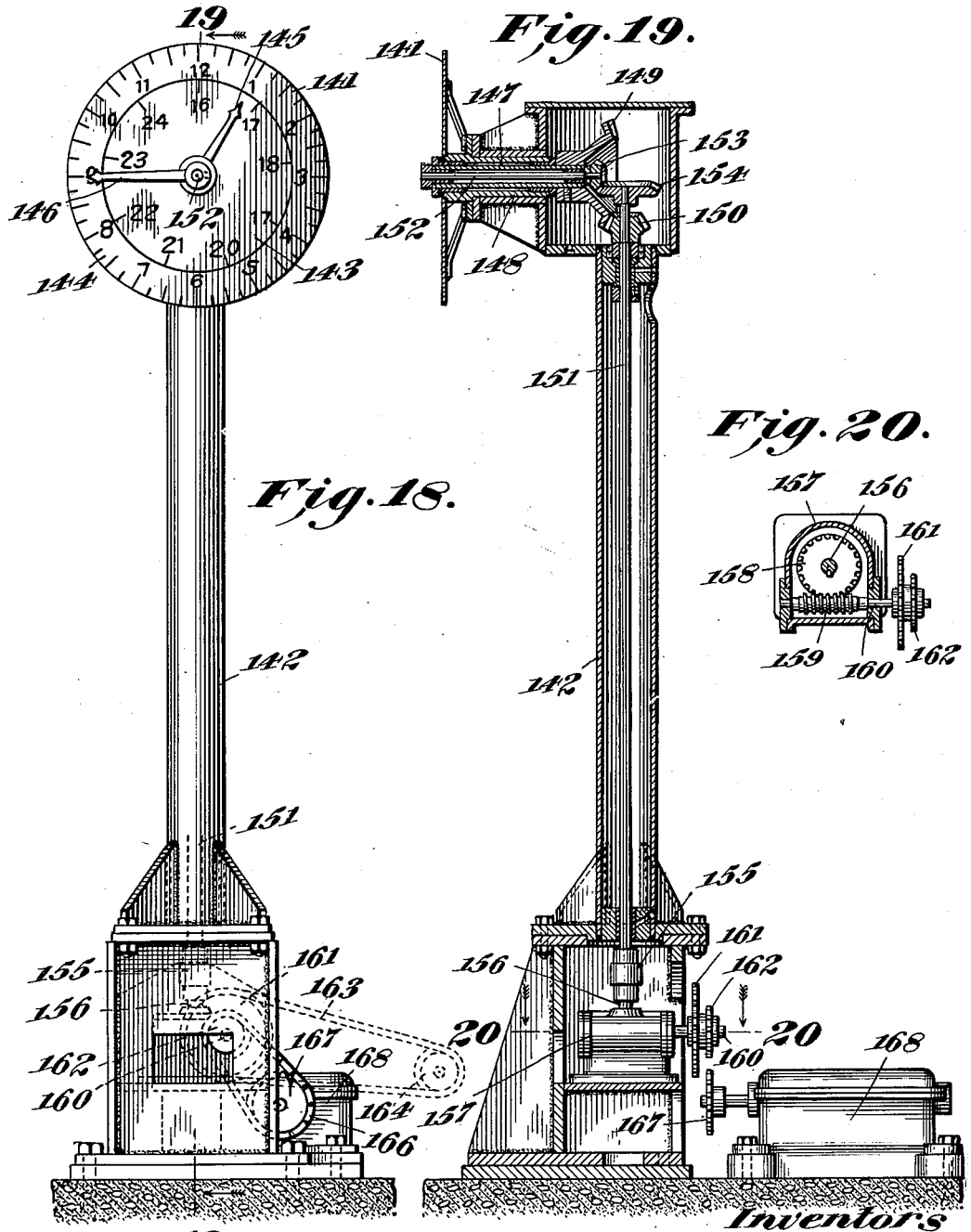

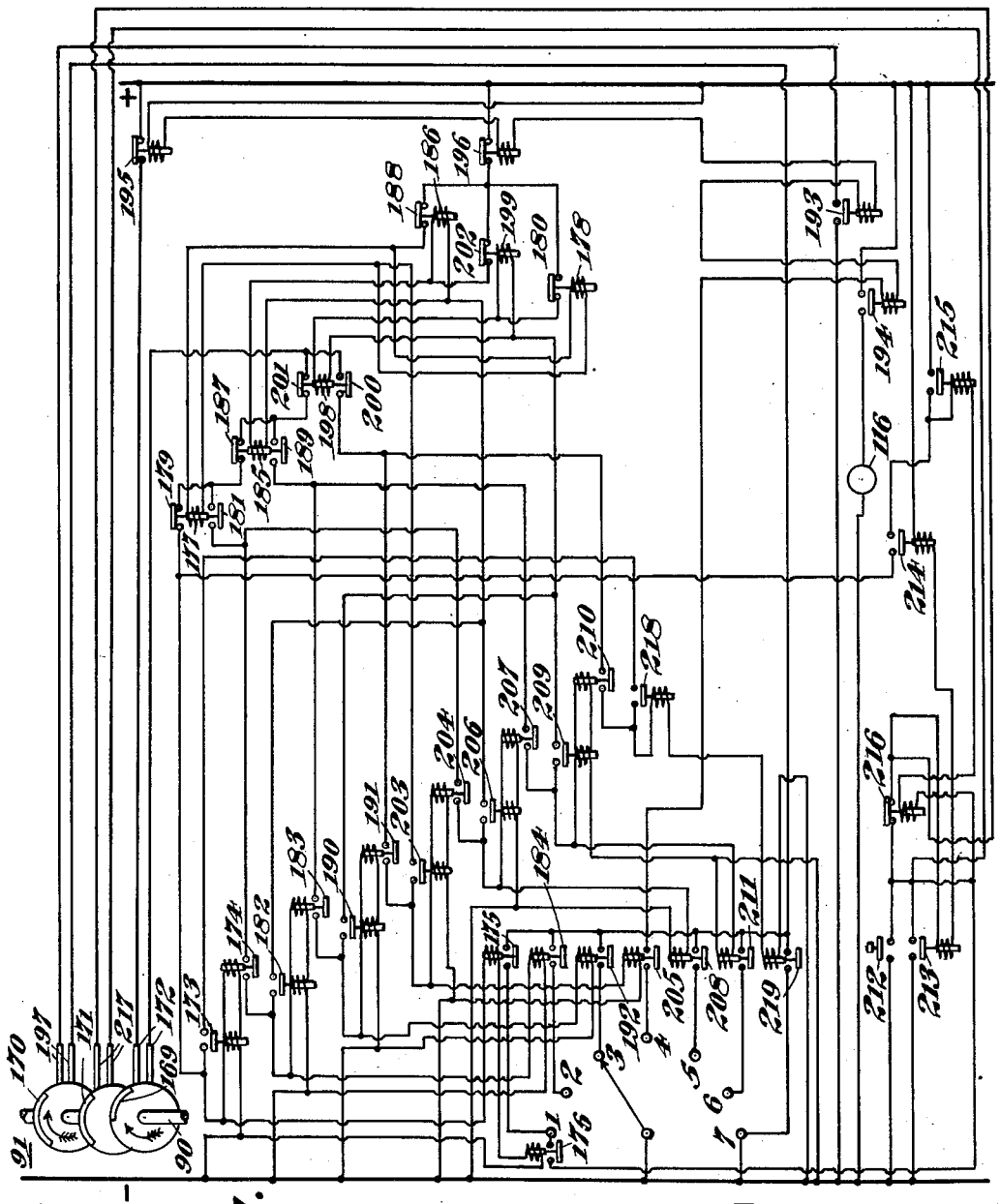

Relative Horizontal Speeds.
$S = C(8.125 \sin a + 3 \times .375 \sin 3a)$

Patented Mar. 24, 1953

2,632,232

UNITED STATES PATENT OFFICE 2,632,232

FLYING HOT SAW

Tom Wilson and Lawrence J. Hess, Baltimore, Md., assignors to Bethlehem Steel Company, a corporation of Pennsylvania Application November 12, 1947, Serial No. 785,372

12 Claims. (Cl. 29—69)

This invention relates to apparatus for automatically severing rapidly moving objects such as pipes, rods and the like into predetermined lengths and is more especially designed for use with a continuous butt weld pipe mill. In pipe mills of this type the skelp when it comes from the rolling mill is in large coils. These coils are fed rapidly in succession to a machine which uncoils the skelp and straightens it and then it is advanced in a ribbon like form on a run out table or floor of the mill to form a long loop or a series of loops. The skelp is then passed through a furnace where it is heated to a welding temperature. As it issues from the heating furnace it is drawn through a bell or forming rolls, then between welding and sizing rolls, and while still hot and moving rapidly it is cut by a flying saw into commercial lengths. The cut lengths are then passed between descaling rolls and lastly transferred to a cooling bed. After a coil of skelp has been fed in this manner the next coil is placed in the machine for uncoiling. As this coil is fed to the run out table the crop ends of the rear end of the fed coil and the forward end of the coil to be fed are cut off and the two ends welded together. These operations are repeated and the skelp and pipe formed therefrom are advanced continuously at high speed.

In one well known and often used type of flying saw, a guide or trough supports the moving pipe in a fixed position with reference to the saw carriage, while the motor and saw are tilted laterally thereof on a reciprocating saw carriage to cut the pipe.

This type of saw in operation, however, has several disadvantages. If the pipe is traveling at a speed of 500 feet or more a minute as is the case in forming the smaller sized pipe and is being cut into 20 foot lengths, the saw must make every cut in less than two and one half seconds. To trip the weight of the saw and motor at this high speed causes excessive wear on the carriage and to eliminate this condition the mill has to be slowed down, thus reducing the tonnage produced, or else an undue amount of valuable time and labor must be expected to be wasted in frequent shut downs for repairs.

One of the objects of our invention relates to the mechanism for automatically raising the pipe above the normal pass line into cutting engagement with the saw by means of a reciprocating swinging trough during a forward stroke of an oscillating saw carriage.

Another object of our invention relates to the mechanism for controlling the vertical movements of the reciprocating swinging trough.

Another object of our invention relates to the apparatus for holding the reciprocating swinging trough in a lower path which allows the pipe to follow the normal pass line during one or a plurality of reciprocations of the carriage.

Another object of our invention relates to generally to the apparatus for controlling the vertical movements of the reciprocating swinging trough for cutting into predetermined lengths continuously moving pipe during one or a plurality of oscillations of the carriage and means for synchronizing the movement of a pipe severing device with the moving pipe.

Another object of our invention relates to the manner of supporting the saw carriage for swinging movement.

Another object of our invention relates to the mechanism for driving the saw.

Another object of our invention relates to the carriage and cutting apparatus of this type with means which can be preset to indicate the travel of the pipe in feet and inches per minute.

Another object of our invention relates to a carriage and cutting apparatus of this type with mechanism which can be preset to cut automatically a plurality of pipe sections of uniform lengths.

Another object of our invention relates to a carriage and cutting apparatus of this type with mechanism by means of which pipe sections of different lengths can be automatically cut.

Another object of our invention relates to the means for adjusting the stroke of the saw carriage.

Another object of our invention relates to a carriage and cutting apparatus of this type having a lost motion device between the rocking lever and the motor for adjusting its stroke.

With the foregoing and other objects in view, the invention will be more fully described hereinafter, and will be more particularly pointed out in the appended claims.

Referring now to the accompanying eleven sheets of drawings which form a part of this specification and on which like characters of reference indicate like parts.

Figure 1 is a front elevation of a pipe severing device embodying our invention with parts shown in section.

Fig. 2 is a detail section of the cone-drive gearing for the rotating saw taken on the line 2—2 of Fig. 3.

Fig. 3 is a detail section taken on the line 3—3 of Fig. 2.

Fig. 4 is a transverse section taken substantially on the line 4—4 of Fig. 1.

Fig. 5 is a detail side elevation of the solenoid, latch lever and bell crank for controlling the cam members.

Fig. 6 is a detail section taken on the line 6—6 of Figure 4.

Fig. 7 is a detail of the rocking lever and connections with parts in section.

Fig. 8 is a detail view of the constant drag brake taken on the line 8—8 of Fig. 7.

Fig. 9 is a detail view showing the jaws of a lost motion device taken on the line 9—9 of Fig. 7.

Fig. 10 is a detail of the carriage drive mechanism with parts in section taken substantially on the line 10—10 of Fig. 1 to show more clearly the construction.

Fig. 11 is a detail in top plan showing the mill motor and the last sets of sizing rolls for advancing the pipe past the saw carriage.

Fig. 12 is a detail section of the controlling apparatus for the cams taken on the line 12—12 of Fig. 1.

Fig. 15 is a diagram of the electrical control circuits for producing a uniform action saw carriage drive.

Fig. 16 is a detail view of a device which indicates the travel of the pipe in feet per minute.

Fig. 17 is a diagram illustrating an arrangement to preset the length of pipe to be cut.

Fig. 18 is a front elevation of the dial indicator device.

Fig. 19 is a vertical longitudinal section of the dial indicator device taken on the line 19—19 of Fig. 18.

Fig. 20 is a detail transverse section showing the driving gears for the dial indicator taken on the line 20—20 of Fig. 19.

Fig. 21 is a diagram of the electrical control circuits for the sequence operation which will determine the number of oscillations of the saw carriage per cut of pipe section.

Figure 13:
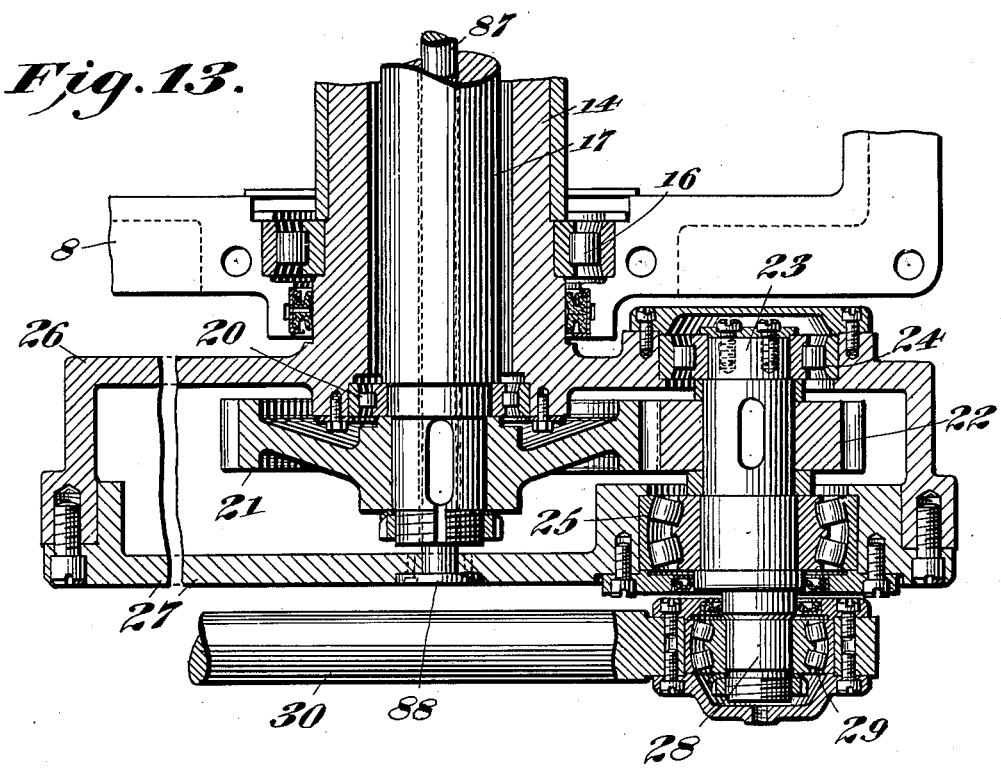
Fig. 13 is a detail view in section also taken on the line 10—10 of Fig. 1 showing the connection between the cut timing gears and the connecting rod which extends and is pivoted to the rocking lever.

Referring now to the various characters of reference on the drawings, the numeral 1 indicates the moving pipe to be cut, 2 the sizing rolls, 3 the mill motor for rotating the forming and sizing rolls to advance the pipe, 4 the motor for adjusting the block in the rocking lever and 5 the motor for oscillating the saw carriage and the cam operating devices for actuating the movable trough 6 to raise the pipe 1 into cutting engagement with the saw.

The extending shaft of the motor 5 is coupled to a shaft 7 journaled in a gear casing 8 which extends beyond the same at its opposite end and is connected by a train of gearing 9 to a synchro-tie generator 10 and tachometer 11. The shaft 7 journaled in the gear casing 8 is provided with a worm 12 meshing with a worm wheel 13 which is keyed to a rotating tubular shaft 14 journaled in roller bearings 15 and 16 in the gear casing 8. A fixed shaft 17 extends through the tubular shaft 14 and is keyed at one end as at 18 to the cap 19 for the roller bearing 15 and supported near its opposite end in a roller bearing 20 and extends beyond the same and has a gear 21 keyed thereto meshing with a pinion 22 mounted for planetary movement around the gear 21 on a stub shaft 23 journaled in roller bearings 24 and 25 of the casing for gear 21, and the pinion 22, which has its inner cup shaped portion 26, formed integral with the tubular shaft 14 and an outer cover portion 27 attached thereto.

The stub shaft 23 has an outwardly crank portion 28 which is eccentrically disposed in relation to the main body of the stub shaft and is provided with a roller bearing 29 thereon for pivoting one end of a pitman rod 30 which extends to the rocking lever 31 and is pivotally connected to the adjustable block 32. The rocking lever 31 has spaced side frame members 33 and 34 which are pivotally connected at their lower ends as at 35 to one end of the saw carriage 36. The side frame members 33 and 34 are connected at intermediate points by means of cross-tie web plates 37 and 38 and at the upper end by means of a housing 39 which is connected to the cross web plate 38 centrally by means of a tubular casing 40. The web plates 37 and 38 and the upper end of the tubular casing 40 are provided with bearings 41, 42 and 43 in which is journaled a spindle 44 having a beveled gear 45 secured to its upper end and at its lower portion threaded as at 46 for engaging the adjustable block 32. The housing 39 at the upper end of the rocking lever 31 is provided with trunnion projections 47 and 48 journaled in bearings 49 and 50 mounted in the frame 51 of the machine. Journaled in the housing 39 at the upper end of the rocking lever 31 is a shaft 52 having a beveled pinion 53 secured thereto for meshing with the beveled gear 45 on the upper end of the spindle 44. The shaft 52 extends through the central portions of the trunnion 48 and has a brake disk 54 for a band brake 55 which is connected to bearing 50 by means of a pin 56 and is adapted to produce a constant drag on the brake disk 54. The brake disk 54 is also provided with a pair of jaws 57 for engaging a similar pair of jaws 58 extending from a brake disk 59 for a friction brake secured to a shaft 60 of the motor 4. The jaws 57 and 58 are spaced far enough apart to allow the rocking lever 31 to swing its maximum stroke and form a lost motion device during the normal oscillation of the saw carriage 36.

When it is desired to adjust the stroke of the carriage 36 the motor 4 will rotate the brake disks 54 and 59 and shaft 52 thereby rotating beveled pinion 53, beveled gear 45 and spindle 44 to raise or lower the adjusting block 32 depending upon which way the shaft 60 of the motor 4 is rotating.

The adjustable block 32 has trunnions 61 extending from its opposite sides. The trunnions 61 are pivoted in journal bearings in the bifurcated end of pitman rod 30 which has its other end pivoted on the roller bearing 29 on the crank portion 28 of the stub shaft 23.

The carriage 36 comprises a frame 62 formed tubular at one end as at 63 in which is journaled a shaft 64 having a saw 65 secured to the outer end. The shaft 64 is driven by a cone-drive having the worm wheel 66 mounted on the inner end of a shaft 68 meshing with a worm 67 which is mounted on the shaft 64 journaled in the carriage frame 62 and the shaft 68 is also provided with a pulley 69 for a texrope drive having a multiple belt connection to the pulley 70 of the motor shaft 71 of a motor 72. The motor 72 is mounted on the horizontal portion of an L-shaped support 73 and is adapted to have limited movement by having the vertical portion 74 extending upwardly and pivoted at an intermediate point to a bracket 75 which extends from the side of the frame 51 of the machine and having an eye bolt 76 pivoted to the upper end of the vertical portion 74 which extends through the side wall of the frame 51 and provided with a spring 77 held in position by means of a nut 78.

The saw carriage 36 at each end has a link connection to the frame 51 to allow for swinging movement. The rocking lever 31 is adapted to serve as one link for supporting one end of the carriage while the other end of the carriage has a link 79 the lower end of which is pivoted thereto as at 80 and the upper end is pivoted to the frame 51 as at 81.

Extending downwardly from the end of the saw carriage 36 below the rocking lever 31 is an arm 82 to the lower end of which is pivoted as at 83 one end of a pair of connecting rods 84. The other ends of the rods are pivoted as at 85 to the movable trough 6 and the upper end of the vertical link 86.

In order to actuate the limit switch that controls circuits for the sequence operation, which will determine the number of oscillations of the saw carriage per cut, the fixed shaft 17 is also formed tubular for receiving a shaft 87 which extends through the fixed shaft 17 with its end extending beyond the same. The outer end of said shaft 87 is formed with a head 88 which is secured to the cover 27 while the other end of the shaft 87 extends beyond the fixed shaft 17 and is coupled as at 89 to the shaft 90 of a limit switch 91.

In operation the saw carriage 36 and saw 65 are adapted to oscillate continuously with the saw motor 72 in a substantially fixed position in relation thereto while the trough 6 is adapted to raise the pipe 1 into cutting engagement with the saw 65 for one or after a plurality of oscillations of the carriage.

The operation of tilting the trough 6 with the pipe 1 into cutting engagement with the saw 65 will be more clearly understood by referring to Figs. 1, 4, 5, 6 and 12 of the drawings. A beveled gear 92 is keyed to the intermediate portion of the tubular shaft 14 which meshes with a similar beveled gear 93 secured to a shaft 94 mounted in a bearing 95 in the gear casing 8. The shaft 94 extends outwardly and downwardly beyond the side wall of the gear casing and is coupled to a spindle 96 which has its lower end coupled to a shaft 97 having a beveled gear 98 secured to its lower end meshing with a similar gear 99 mounted on the outer end of a cam shaft 100 which is journaled in bearings 101 and 102 in a housing 103.

The cam shaft 100 has a cam member 104 mounted thereon at an intermediate point which is splined thereto as at 105 to allow for longitudinal movement. The cam member 104 has a collar 106 provided with an annular groove 107 to receive the trunnion projections 108 of a forked lever 109 which is mounted on a shaft 110 having at one end a bell crank lever 111 having a pawl 112 for engaging a latch lever 113 which is pivoted to a standard 114 as at 115 and actuated to unlock the latch by means of a solenoid 116. The cam member 104 has a main cam 117 for engaging a cam roller 118 mounted on a shaft 119 journaled in the lower end of the vertical movable link 86 and is further provided at its ends with bell crank arms 120 for engaging fixed stops 121.

The cam member 104 is also provided with a secondary cam 122 for engaging a cam roller 123 which is mounted on an extension 124 of the bearing 101 and adapted to slide the cam member to disengage the main cam 117 out of engagement with the cam roller 118.

The solenoid 116 when energized is adapted to actuate the latch lever 113 to release the latch and resilient means to return the latch to latching position comprising an eye bolt 125 pivoted as at 126 to the latch lever and extending downwardly therefrom through one leg of an L-shaped bracket 127 having a washer 128 and nuts 129 on its lower end with a spring 130 interposed between the washer 128 and the leg of the L-shaped bracket 127.

The bell crank lever 111 on the end of shaft 110 has a horizontally extending arm to which is pivoted as at 131 a clevis bolt 132 the shank of which extends upwardly with the upper end extending through a bracket 133 which is secured to the housing 103, and a spring 134 is interposed between the clevised head of 132 and the bracket. This spring normally holds the bell crank lever 111 in a position to the forked lever 109 to move the cam member 104 so that the main cam 117 and secondary cam 122 will be out of engagement with the cam rollers 118 and 123.

The bell crank arms 120 are pivoted to the ends of the shaft 119 and extend laterally therefrom and have their outer ends connected to a shaft 135 provided with a vertically extending arm 136 having its lower end pivoted to a clevis bolt 137 the shank of which extends through the side wall of the housing 103 and has a washer 138 and nut 139 on its outer end with a spring 140 interposed between the washer 138 and the side wall of the housing 103.

As shown in Fig. 1 the saw carriage 36 is in a forward stroke with the pipe 1 raised above the normal pass line to the cutting position by the vertically movable trough 6. The vertical movements of this trough are controlled by the main cam 117 and on all return strokes of the carriage the vertically movable link 86 carrying the trough is held down against the fixed stops 121 by gravity and the pressure of the spring 140 thereby holding the trough to a lower path which allows the pipe 1 to follow the normal pass line below the path of the saw 65. Also on the return stroke the main cam 117 is disengaged from the cam roller 118 by the secondary cam 122 and is normally held in the disengaged position by the latch lever 113 engaging the bell crank lever 111 mounted on one end of the shaft 110 carrying the forked lever 109. The solenoid 116 when energized after one or a plurality of oscillations of the saw carriage actuates the latch lever 113 thereby releasing the bell crank lever 111 and allows the saw 65 to cut the pipe 1 on the next forward stroke of the carriage 36. The cams and latch mechanisms and adjacent parts will then be in the position indicated in full lines in Figs. 1, 4, 5 and 12. In Figs. 18 and 19 we have shown means for indicating the length of pipe cut in which 141 is a dial mounted on a pedestal support 142 having indicating scales graduated in feet as at 143 and inches as at 144 and provided with pointer hands 145 and 146 therefor respectively. The shorter hand 145 pointing to feet is secured to the outer end of a tubular horizontally extending shaft 147 supported in a journal bearing 148 extending from the top portion of the pedestal support 142 and has a beveled gear 149 mounted on its opposite end which meshes with a beveled miter gear 150 which is secured to a vertically extending shaft 151 near the top portion. The longer pointer hand 146 is secured to the outer end of a small shaft 152 mounted in the tubular shaft 147 and has a beveled miter gear 153 secured to its opposite end meshing with a beveled gear 154 attached to the upper end of the shaft 151. The vertically extending shaft 151 is journaled in the pedestal support 142 and is coupled at its lower end as at 155 to a stub-shaft 156 journaled in a housing 157 and having a worm wheel 158 mounted thereon meshing with a worm 159 supported in the housing 157 and having a shaft 160 extending outwardly therefrom upon which are mounted sprocket wheels 161 and 162. The sprocket wheel 161 is connected by means of a sprocket chain 163 to a sprocket wheel 164 on the shaft of motor 4 which extends to a synchro-tie generator 165, and the sprocket wheel 162 is connected by means of a sprocket chain 166 to a sprocket wheel 167, on the shaft for a limit switch 168.

Figure 14:
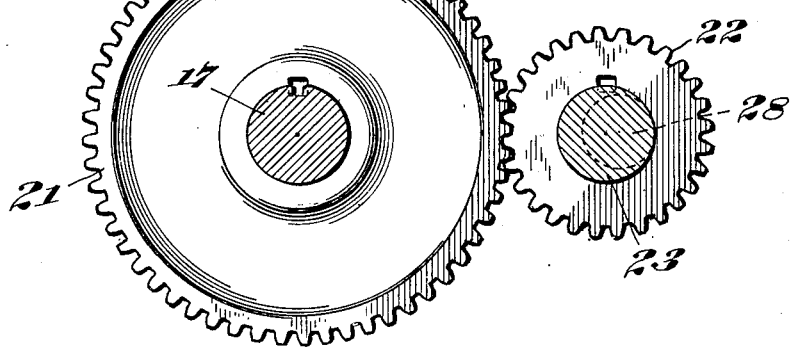
Fig. 14 is a detail of the planetary gears for controlling the saw cuts.
Figure 22:
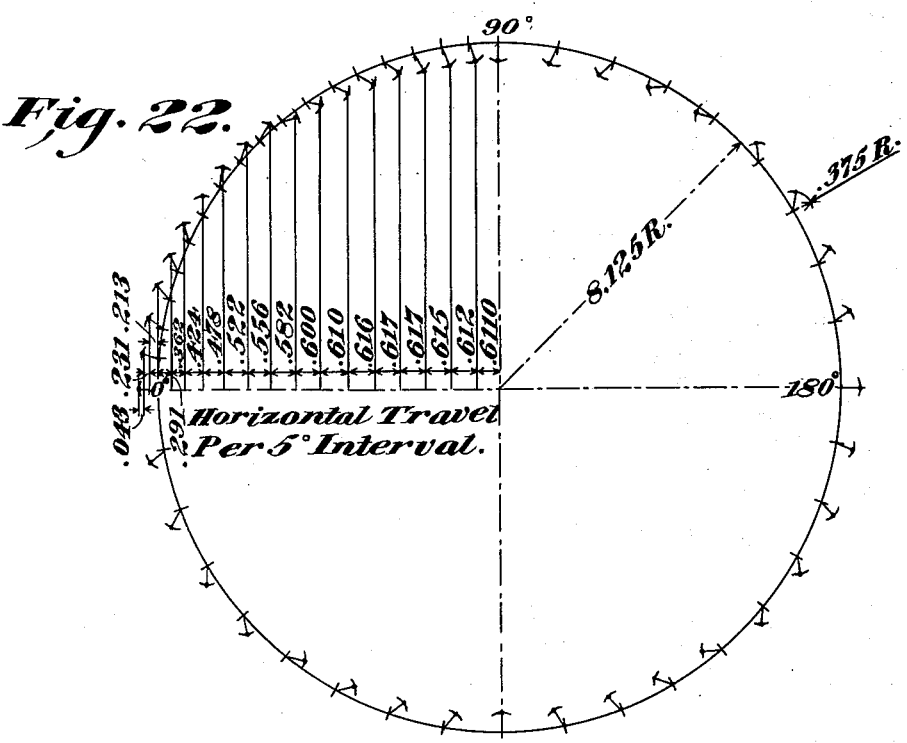
Fig. 22 is a diagram showing the circular path of the stub shaft for the planetary moving pinion and the horizontal movement per 5° intervals of the crank or eccentrically disposed portion.
Figure 23:
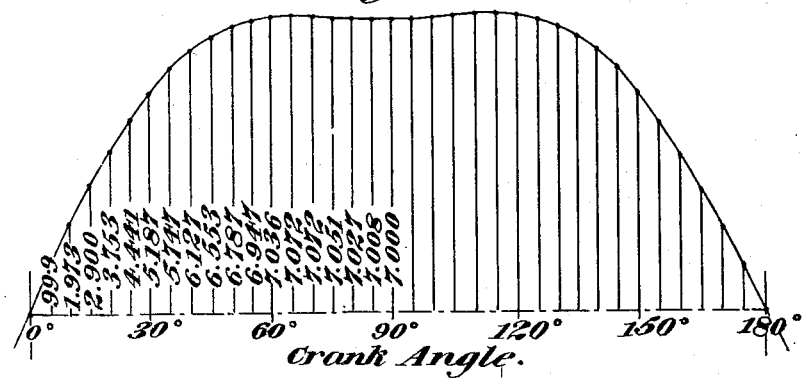
Fig. 23 is a diagram showing the relative horizontal speeds of the crank or eccentrically disposed portion of the stub shaft during the reciprocation of the saw carriage.

The speed of the driving means is controlled to suit the speed of the pipe 1, through synchro-tie generators and motors as the speed and stroke of the saw carriage 36 will vary with the adjustment of the pivotal end of the pitman rod 30 on the rocking lever 31 it is necessary to compensate for the variation during the cutting operation by having the opposite end of the pitman rod 30 pivoted on the eccentrically disposed portion 28 of the stub-shaft 23. As indicated in Figs. 13 and 14 the pinion 22 on the stub-shaft 23 revolves in a circular path around the fixed gear 21 in a planetary manner with the crank or eccentrically disposed portion of said stub-shaft traveling in an eccentric path as indicated in the diagram in Fig. 22. This will give a relative horizontal uniform speed to the saw carriage 36 and saw 65 during the cutting operation as indicated in the central portion of the diagram shown in Fig. 23.

The pinion 22 revolves once around the fixed gear 21 for each oscillation of the saw carriage 36, while at the same time the shaft 87 secured to the cover 27 and shaft 90 of limit switch 91 rotate the control segments 169, 170 and 171 of the limit switch 91 one revolution for each oscillation of the saw carriage 36 and the control for the sequence operation which will determine the number of revolutions of the pinion 22 per cut is indicated in Fig. 21. This diagram shows an arrangement that will accommodate any spacing from one revolution to seven revolutions of the pinion 22 and control segments per cut, and assuming that the contact arm for the cut selector is set on No. 3 position and the coils for the relays are deenergized and in the position as indicated in the diagram, when control segment 169 makes contact with the fingers 172 it closes relays 173, 174, 175 and 176. A holding circuit is established through coils 177 and 178, but current does not flow through the same until control segment 169 breaks contact, at which times coils 177 and 178 are energized, opening contacts 179 and 180 and closing 181.

When control segment 169 makes contact with the contact fingers 172 on the second revolution, relays 182, 183, and 184 are closed and a holding circuit established through coils 185 and 186, but current does not flow until control segment 169 breaks contact at which time coils 185 and 186 are energized thereby opening contacts 187 and 188 and closing contact 189. Coils 177 and 178 are deenergized, closing contacts 179 and 180 and opening contacts 181, 173, 174, 175 and 176. The functioning of segments 170 and 171 has no effect on this sequence.

When control segment 169 makes contact with the contact fingers 172 for the third revolution, relays 190, 191 and 192 are closed thereby immediately closing relays 193 and 194 for controlling the solenoid 116 and opening relays 195 and 196. Relays 193 and 194 remain closed due to the interlocking action of the control segment 170 which engages the contact fingers 197 of the holding circuit. This closes 193 and 194 and opens relays 182, 183, 184, 190, 191 and 192, thus resetting the control relays. Control segment 170 then breaks contact to open relays 193 and 194 and closes relays 195 and 196 after the cut is made.

Assuming that the cut selector has been set for No. 6 when control segment 169 makes contact with the fingers 172 on the third revolution relays 190, 191 and 192 are closed and this establishes its holding circuit through coils 198 and 199. When contact segment 169 breaks contact 200 closes and 201 and 202 are opened, and the holding circuit for 182, 183, 184, 185 and 186 is opened.

On the fourth revolution when control segment 169 makes contact with the fingers it closed relays 203, 204 and 205. One side of the circuit is made through contacts 200, 191 and through 203, 204 and 205 coils to — bus bar line, and the holding circuit from the + bus bar line through relay contacts 196 and 188, coils 177 and 178, contactors 203, coils 203, 204 and 205 to the — bus bar line. When coils 177 and 178 are energized contact 200 is opened through the interruption of the holding circuit for 190, 191 and 192.

On the fifth revolution when the control segment 169 makes contact with the fingers, it closes relays 206, 207 and 208. One side of the circuit is made through contacts 201, 187, 191, 204, coils 206, 207 and 208 to — bus bar line, and the holding circuit through contacts 196, 202, coils 185, 186, contact 206 and coils 206, 207 and 208 to — bus bar line. When the coils 185 and 186 are energized contacts 187 and 188 are opened and contact 189 is closed and interrupts the holding circuit for 203, 204 and 205.

On the sixth revolution when the contact segment 169 makes contact with the fingers it closes relays 209, 210 and 211 and immediately closes relays 193 and 194 which control the saw solenoid and opens contacts of 195 and 196 relays.

Relays 197 and 198 remain closed through the interlocking action of the holding circuit and contact segment 170. The opening of relays 195 and 196 opens relays 206, 207, 208, 209, 210 and 211, thus resetting the control relays and when contact segment 170 breaks contact it opens relays 193 and 194 and allows 195 and 196 to close. After the cut is made all the relays will be deenergized and will be in the position indicated in Fig. 21, and the desired sequence can be repeated.

If a test piece is desired, the push button 212 is pressed and relays 213 and 214 will be closed and stay closed through the action of the holding circuit as established by relay 213. If this occurs during the first revolution of a sequence when relays 173, 174, 175 and 176 are closed, relays 193 and 194 will be closed by a circuit established from the — bus bar line through contacts 213, 176, 175, coils 194, 193, 196 and 195 to the + bus bar line. This will actuate the saw cut solenoid 116 as described previously.

At the same time that this is occurring the interlocking and disconnecting circuit for the test piece circuit is functioning. After the closing of 213 and the resulting closing and interlocking of 213 and 214 and when contact segment 169 engages the contact fingers 172 a circuit will be established from the + bus bar line through segment 169, contacts 201, 187, 179, 213, coils of 215 and 216, and contact 213 to — bus bar line. This will open 216 and close 215. At the same instant 169 closes the contact segment 171 will engage the fingers 217 and close a circuit shorting contact 216. As a result the holding circuit of 213 and 214 will be maintained until switch 171 is opened. At the same time coil 215 establishes a holding circuit for itself and 216 through its own contact.

When contacts 193 and 194 are closed contacts 195 and 196 will be opened deenergizing coils 175 and 176. However, contacts 195, 196, 193, and 194 will be interlocked by contact segment 170 until after contact segment 169 is opened and the test piece cut. When contact segments 170 and 171 are opened contacts 193 and 194 will open and the short around 216 will be withdrawn, allowing 216 to break the interlocking circuit 213 and 214. When 213 opens the interlocking circuit of 215 and 216 will be broken and 216 will open, thus restoring the test piece circuit to normal.

In case push button 212 is closed after the first revolution, the sequence will continue to completion, and on the next revolution when contact segment 169 engages the contact fingers 172, a test piece will be cut as previously described.

Relays 218 and 219 are also provided for a seventh revolution per cut.

With this manner of control after the saw has made its cut all the coils for the relays will be deenergized and the desired sequence can then be repeated.

Referring now to Fig. 15 which is a view showing diagrammatically the electrical circuits for controlling the operation of the drive for flying saw, the positive and negative bus bars are indicated by the numerals 220 and 221 respectively, 3 the mill motor, 4 the motor for adjusting the stroke of the swinging lever, and 5 the motor for oscillating the saw carriage 36, each of which is provided with a circuit 222, 223 and 224, respectively, extending to the bus bars 220 and 221. The mill motor 3 is connected by means of gearing 225 or the like to a synchro-tie generator 226 which is adapted to drive through the circuit connection 227 a synchro-tie motor 228 which has a shaft for actuating a mechanical differential 229 provided with a regulator 230 to adjust the speed of the driving motor 5 and a cone pulley 231 which is connected by means of a belt 232 to the cone pulley 233, having a shaft 234 rotated by means of a synchro-tie motor 235 having a circuit connection 236 extending to the synchro-tie generator 10 for the motor 5. For adjusting the speed of the driving motor 5 to compensate for various saw radii the belt 232 connecting the cone pulleys 231 and 233 is provided with a threaded belt shift 237 which is adjusted by means of a threaded rod 238 adapted to be rotated by means of a synchro-tie motor 239, having a circuit 240 extending to a synchro-tie motor 241. These two synchro-tie motors 239 and 241 receive their power from the synchro-tie generator 165 driven by the motor 4 for adjusting the stroke of the rocking lever 31, through the circuit 242.

In order to provide for vernier adjustment of the pulleys 231 and 233 and the saw stroke, the synchro-tie 241 has a shaft 243 connected by means of a train of gearing 244 with the shaft of the motor 245 having a circuit connection 246 extending to the bus bars 220 and 221. Said motor 245 is also provided with a brake 247 for controlling the same.

The motor 5 for oscillating the saw carriage has its shaft provided at one end with a D. C. magneto generator 248 having a circuit connection 249 extending to a voltmeter 250 calibrated for indicating the gear motor speed.

The opposite end of the shaft for the driving motor 5 is connected to reduction gearing in the gear casing 6 as shown in Fig. 10 of the drawings. The shaft of motor 5 is also connected by a train of gearing 9 to a synchro-tie generator 10 and a tachometer 11 which may be used in addition to the meter 250 for indicating the speed of the driving motor 5 at this point.

Mounted on a support adjacent to one end of the gear casing 8 is the limit switch 91 having the control segments 169, 170 and 171 and contact fingers 172, 197 and 217 mounted therein for the saw cut control circuits.

The motor 4 for adjusting the stroke of the rocking lever 31 and synchro-tie generator 165 have their shafts coupled together with a sprocket wheel 164 mounted on the shaft of the motor 4 connected by means of a sprocket chain 163 to a sprocket wheel 161 on the shaft 160 for the worm 159 for actuating the hands on the dial 141 to indicate the length of pipe being cut. The worm shaft 160 is also provided with a sprocket wheel 162 which is connected by means of a sprocket chain 166 to a sprocket wheel 167 for actuating a limit switch 168 for controlling a dial indicator, the operation of which will be clearly understood by referring to the diagram shown in Fig. 17. In this diagram illustrated in Fig. 17 there is shown the indicating dial 251 with an arrangement to preset the length of pipe to be cut. This dial has a scale 252 which reads in inches corresponding to the length of the travel of the pivotal point upon the rocking lever 31 which controls the stroke of the saw carriage. This dial is driven through a synchro-tie connection to the rocking lever stroke adjusting motor 4 comprising chain and sprocket connections, synchro-tie generator 165, circuit connection 253, synchro-tie motor 254 and shaft 255 provided with a beveled gear 256 meshing with a beveled gear 257 which engages the periphery of the dial 251.

Pivoted centrally to the dial 251 is a contact arm 258 having a pointer 259, which can be moved to any predetermined value desired upon the scale 252, depending upon the length of pipe to be cut, by means of an adjusting knob 260. With this device the operator while rolling a schedule of pipe of a given length will determine the next length of pipe to be cut and will move the contact arm 258 to a value on the scale 252 that will correspond to the arc through which the rocking lever arm will travel. To illustrate this, assume that the operator by means of the adjusting knob 260 moves the contact arm 258 to the right, which would permit cutting a longer length of pipe than is being cut at the time this change is being made. Nothing will happen until the double throw switch 261 which is marked "manual" at the top and "automatic" at the bottom is thrown to the bottom. When this is done the left-hand blade of the switch 261 shown in Fig. 17 will be active and will close the circuit to the operating coils 262 and 263 marked "long" in the diagram. The circuit will be from the left-hand bus bar through coils 262 and 263 marked "long" and then back to the revolving segment 264, contact 258, middle stud of knob 260 of dial 251 and then back to the opposite side of the control bus bar. This will start motor 4 in the direction to increase the length or radius of the rocking lever arm and by means of the synchro-tie equipment the dial 251 will rotate until its automatic position corresponds to the preset position of the contact arm 258 at which time the motor 4 will stop.

If the operator desires to cut a shorter length of pipe he moves the contact arm 258 to the left which will permit cutting a shorter length of pipe than is being cut at the time this change is being made. When the switch 261 is thrown into the "automatic" position, the right-hand blade of said switch will be active and will close the circuit to the operating coils 265 and 266 marked "short." The circuit will then be from the left-hand bus bar through coils 265 and 266 marked "short" and then back to the revolving segment 267, contact arm 258, middle stud or knob 260 of dial 251, and then back to the right-hand bus bar. This will start motor 4 in the reverse direction to that above described and will decrease the length or radius of the rocking lever and by means of the synchro-tie equipment, the dial 251 will rotate until its off position corresponds to the preset position of the contact arm 258 at which time the motor 4 will stop.

If for any reason it is desirable to inch the motor 4 to change the radii of the rocking lever arm, the switch 261 can be moved to the upper position marked "manual" after which the motor 4 can be moved in one direction or the other depending upon which way the vertical handle 268 of the master switch 269 is moved. It will be noted that on the left-hand side the master switch 269 is marked "long" and on the right-hand side "short." The switch 261 is a standard double-pole type of control switch and is adapted for the operator to hold it in position until the desired movement is completed and then return it to the off position.

If there is any over-travel the said two-pole switch 261 will cause the motor 4 to start in the reverse direction to come back to position.

In Fig. 16 is shown a device that will indicate the travel of the pipe in feet per minute, and a corresponding instrument that will be calibrated on a similar scale that is operated by a magneto generator on the motor 4 that rotates the rocking lever arm. This consists of a pinch roll 270 which contacts with the traveling pipe I which drives a D. C. magneto generator 271 to which is connected a voltmeter 272 calibrated in feet per minute. A similar instrument 250 is connected to the magneto generator 248 driven by the motor 5.

Having thus given the foregoing general and detailed description of our invention, we will now further describe the operation of the same.

Assuming that the cut selector is set on No. 3 position as indicated in Fig. 21, the pipe I, after leaving the welding and sizing rolls 2, is advanced through the channel or stationary trough 273 into the movable trough 6 adjacent to the continuously oscillating saw carriage 36 having a continuously rotating saw 65 mounted thereon. The upper ends of the rocking lever 31 and the link 79 are pivotally supported on the stationary frame 51 of the machine, while the lower ends of said rocking lever 31 and the link 79 are pivoted to the saw carriage 36 which is adapted for longitudinal swinging movement.

The saw carriage 36 is oscillated by means of a motor 5 through shaft 7, worm 12 and worm wheel 13 which is keyed to a rotating tubular shaft 14 journaled in bearings in the gear casing 8. The tubular shaft 14 has an enlarged extending cup shaped portion 26 with a cover 27 in which is journaled the stub shaft 23 having a pinion 22 mounted thereon adapted to revolve in a concentric planetary path around a fixed gear 21. The stub shaft 23 has a crank arm 28 eccentrically disposed extending portion for pivoting one end of the pitman rod 30 having its opposite end pivoted to the adjustable block 32 mounted on the threaded portion 46 of the spindle 44 which is journaled in the rocking lever 31, and rotated by the motor 4.

Keyed to the tubular shaft 14 in the gear casing 8 is a beveled gear 92, meshing with a beveled gear 93 on shaft 94 which is connected by a spindle 96 that is coupled to a shaft 97 provided with a beveled gear 98 meshing with a similar beveled gear 99 on the cam shaft 100 journaled in bearings 101 and 102 and rotatable therein. A cam member 104 is splined to the cam shaft 100 for longitudinal movement having a main cam 117 for engaging cam roller 118 and a secondary cam 122 for engaging cam roller 123. Normally the cam member 104 is in the position indicated in dotted lines in Figs. 4 and 12 with the cam roller 118 disengaged from the main cam 117 and the vertically movable link 86 and trough 6 in the lowered position with the ends of the horizontally extending arms of the bell crank levers 120 secured to the shaft 119 held against the fixed stops 121 by the action of spring 140. In this position the latch 113, and bell crank lever 111 on the end of shaft 110 will be in the latched position as shown in dotted lines in Fig. 5, with the forked lever 109 in the position shown in Fig. 4 and held in these positions by means of the springs 130 and 134 the solenoid 116 being deenergized. The shaft 87 in shaft 17 has its head 88 secured to the outer cover 27 of the cup shaped portion 26 and rotates therewith during each oscillation of the saw carriage 36. The inner end of shaft 87 is coupled as at 89 to the shaft 90 of the limit switch 91 having the contact segments 169, 170 and 171 and the contact fingers 172, 197 and 217 adapted to engage the same mounted therein.

As the cut selector is set on No. 3 during the first two oscillations of the saw carriage 36 the parts will remain in the position indicated in dotted lines in Figs. 4, 5 and 12. On the third oscillation of the saw carriage 36 the limit switch 91 will close the circuit to energize the solenoid 116 thereby disengaging the latch lever 113 from the pawl 112 of the bell crank lever 111 and allowing the springs 130 and 134 to move the parts into position shown in full lines in Figs. 1, 4, 5 and 12. This will bring the main cam 117 into the path of the cam roller 118 and raise the vertically movable link 86 and trough 6 with the pipe 1 into cutting position as the carriage oscillates in the forward stroke. After the pipe 1 has been cut and the solenoid 116 is deenergized, the secondary cam 122 engaging the cam roller 123 will again return the parts to the dotted line position above described, and will be held in this position by the springs until the solenoid 116 is again energized to repeat the operation.

Although we have shown and described our invention in considerable detail, we do not wish to be limited to the exact construction shown and described, but may use such substitutions, modifications or equivalents thereof, as are embraced within the scope of our invention, or as pointed out in the claims.

Having thus described our invention, what we claim as new and desire to secure by Letters Patent is:

1. A machine for severing continuously moving pipe or the like into lengths successively, comprising a stationary frame, a carriage having a link pivoted at its lower end to the carriage and its upper end to the stationary frame for supporting one end of the carriage, a rocking lever having its lower end pivoted directly to the carriage and its upper end to the stationary frame for supporting the other end of the carriage, a motor mounted adjacent thereto for oscillating the carriage, gearing driven by the motor, a screw-threaded rod journaled in the rocking lever, an adjusting block screw-threaded to engage the threaded rod, a pitman rod connecting the driven gearing directly with the adjusting block, means for rotating the threaded rod to raise or lower the adjusting block to vary the oscillating stroke of the carriage, a saw mounted on the carriage, a motor resiliently supported on the stationary frame above the carriage for continuously rotating the saw, a driving connection between the motor and the saw, a vertically movable reciprocating trough mounted for longitudinal swinging movement adjacent to the saw for normally supporting the pipe in the pass line out of cutting engagement with the saw during the oscillation of the carriage, means for actuating the trough to project the pipe laterally into cutting engagement with the saw during an oscillation of the carriage, and means for returning the trough to its normal position after the cutting operation.

2. A machine for severing continuously moving pipe or the like into lengths, comprising a stationary frame, a carriage having a pivoted link connection at each end with the stationary frame, means for oscillating the carriage, means for adjusting the stroke of the oscillating carriage, a continuously rotating saw mounted on the carriage, a motor mounted on the stationary frame for rotating the saw, a trough pivotally connected by means of a rod to the carriage and adapted to oscillate therewith adjacent to the saw for normally supporting the pipe out of cutting engagement therewith, a driving connection between the motor mounted on the stationary frame and the saw, a vertically disposed link pivoted at its upper end to the trough and provided with a cam roller at its lower end, a continuously rotating cam for engaging the cam roller, a latch for normally holding the continuously rotating cam out of the path of the cam roller during the oscillations of the carriage, electromagnetically controlled means for releasing the latch, resilient means for moving the continuously rotating cam into the path of the cam roller to raise the trough vertically to project the pipe into cutting engagement with the saw during an oscillation of the carriage, cam actuated means for returning the cam to its normal position, and stops for limiting the downward movement of the trough.

3. A machine for severing continuously moving pipe or the like into lengths, comprising a stationary frame, a carriage mounted for longitudinal swinging movement from the stationary frame, a rotating saw mounted on the carriage, a motor resiliently mounted above the saw carriage on the stationary frame for continuously rotating the saw, a driving connection between the motor and the saw, means for continuously oscillating the carriage, a vertically movable reciprocating trough pivotally connected to the carriage for normally retaining the saw out of cutting engagement with the pipe during the oscillation of the carriage, and electrically controlled means for actuating the trough to project the pipe laterally to cut the pipe into predetermined lengths during an oscillation of the carriage.

4. A machine for severing continuously moving pipe or the like into predetermined lengths, comprising a stationary frame, a carriage having a pivoted link connection at one end with the stationary frame, a rocking lever pivotally connecting the other end of the carriage with the stationary frame, a motor mounted adjacent thereto for oscillating the carriage, gearing driven by the motor, a screw-threaded rod journaled in the rocking lever, an adjusting block screw-threaded to engage the threaded rod, a pitman rod connecting the driven gearing with the adjusting block, means for rotating the threaded rod to raise or lower the adjusting block to vary the oscillating stroke of the carriage, a saw mounted on the carriage, a motor supported on the stationary frame for continuously rotating the saw, a driving connection between the motor mounted on the stationary frame and the saw, a movable trough pivotally connected to the carriage and oscillating therewith for supporting the pipe adjacent to the saw in the normal pass line out of engagement with the saw during the oscillation of the carriage, a vertically movable link mounted adjacent to the carriage having its upper end pivoted to the movable trough, a cam roller mounted in the lower end of the vertically movable link, a continuously rotating cam mounted adjacent to the cam roller, means for normally holding the continuously rotating cam out of engagement with the cam roller during the oscillation of the carriage, automatic means for moving the continuously rotating cam into alignment with the path of the cam roller during an oscillation of the carriage to raise the trough above the normal pass line to project the pipe into cutting engagement with the saw, and means for retracting the continuously rotating cam from the path of the cam roller after the cutting operaion to return the movable trough to the normal pass line.

5. A machine for severing continuously moving pipe or the like into predetermined lengths, comprising a stationary frame, a carriage having a pivoted link connection at each end with the stationary frame, a rotating saw mounted on the carriage, a motor mounted on the stationary frame for continuously rotating the saw, a driving connection between the motor and the saw, a motor having a connection with driving gearing for continuously oscillating the carriage, a trough pivotally connected to the carriage and adapted to oscillate therewith for supporting the pipe adjacent to the saw, a vertically movable link mounted below and adjacent to the carriage having its upper end pivoted to the movable trough, a cam roller mounted in the lower end of the vertically movable link, a cam shaft adapted to be continuously rotated by a connection with the driving gearing, a continuously rotating cam member mounted on and splined to the cam shaft having a grooved collar and a vertically extending main cam for engaging the cam roller during the pipe cutting operation, a laterally extending secondary cam extending from the cam member, a shaft mounted beneath the cam shaft and extending at right angles thereto, a forked lever secured to said shaft having trunnion projections extending into the groove in the collar of the cam member for moving the main cam into or out of engagement with the cam roller, a bell crank secured to the said shaft having one arm formed with a pawl, a latch for engaging the pawl for holding the main cam out of engagement with the cam roller with the trough in its lower position with the pipe out of engagement with the saw during the oscillations of the carriage, resilient means for holding the pawl in its latched position, a solenoid adapted to be energized to release the latch from the pawl, resilient means connected to the other arm of the bell crank lever for moving the main cam into engagement with the cam roller to raise the trough and project the pipe into cutting engagement with the saw, and resilient means for returning the latch to the latched position with the main cam out of engagement with the cam roller.

6. A machine for severing continuously moving pipe or the like into predetermined lengths, comprising a stationary frame, a carriage having a pivoted link connection at each end with the stationary frame, a rotating saw mounted on the carriage, a motor mounted on the stationary frame for continuously rotating the saw, a driving connection between the motor and the saw, a motor having a connection with driving gearing for continuously oscillating the carriage, a trough pivotally connected to the carriage adapted to oscillate therewith for supporting the pipe adjacent to the saw, a vertically movable link mounted below the carriage having its upper end pivoted to the movable trough, a cam roller mounted on a shaft in the lower end of the vertically movable link, a cam shaft adapted to be rotated by a connection with the driving gearing for oscillating the carriage, a continuously rotating cam member mounted on and splined to the cam shaft having a grooved collar and a vertically extending main cam for engaging the cam roller during the pipe cutting operation, a laterally extending secondary cam extending from the cam member, a shaft mounted beneath the cam shaft and extending at right angles thereto, a forked lever secured to said shaft having trunnion projections extending into the groove in the collar of the cam member for moving the main cam into or out of engagement with the cam roller, a bell crank lever secured to said shaft having one arm formed with a pawl, a latch for engaging the pawl for holding the main cam out of engagement with the cam roller with the trough in its lower position with the pipe normally out of engagement with the saw during the oscillations of the carriage, resilient means for holding the pawl in its latched position, a solenoid adapted to be energized to release the latch from the pawl, resilient means connected to the other arm of the bell crank lever for moving the main cam into engagement with the cam roller to raise the trough and project the pipe into cutting engagement with the saw, resilient means for returning the latch to the latched position with the main cam out of engagement with the cam roller, a housing surrounding the cam actuating mechanism, stops formed on the housing, a cam roller for engaging the secondary cam for sliding the main cam out of engagement with the cam roller in the lower end of the vertically movable link, a shaft for supporting the central portion of a bell crank lever journaled in the housing, said bell crank lever having a pair of horizontally extending arms with their ends pivoted to the ends of the shaft for the cam roller at the lower end of the vertically movable link, said bell crank lever having a vertical downwardly extending arm with a clevis bolt secured to its lower end with its shank extending laterally through the side wall of the housing, a nut on the outer end of the clevis bolt, and a spring on the clevis bolt interposed between the nut and the side wall of the housing for holding the ends of the bell crank lever against the stops formed on the housing.

7. A machine for severing continuously moving pipe or the like into predetermined lengths, comprising a stationary frame, a carriage having a pivoted link connection at each end with the stationary frame, a shaft mounted in the carriage, a saw mounted on the shaft, a cone drive for the shaft, a motor resiliently mounted on the stationary frame having a belt connection with the cone drive for continuously rotating the saw, a motor having a connection with driving gearing for continuously oscillating the carriage, a trough pivotally connected to the carriage and adapted to oscillate therewith for supporting the pipe adjacent to the saw, means for normally holding the pipe out of cutting engagement with the saw during an oscillation of the carriage, and cam actuated means for raising the trough to project the pipe vertically into cutting engagement with the saw during an oscillation of the carriage.

8. A machine for severing continuously moving pipe or the like into lengths, comprising a stationary frame, an oscillating carriage suspended by links for swinging movement from the stationary frame, a saw mounted on the carriage, a motor mounted on the stationary frame for continuously rotating the saw, a driving connection between the motor and the saw, driving means for continuously oscillating the carriage, a trough pivotally connected to the carriage and adapted to oscillate therewith for supporting the pipe adjacent to the saw, means for normally holding the pipe out of cutting engagement with the saw during an oscillation of the carriage, a vertically movable link mounted below and adjacent to the carriage having its upper end pivoted to the movable trough, a cam roller mounted on a shaft in the lower end of the vertically movable link, a cam shaft mounted adjacent to the cam roller adapted to be continuously rotated by a connection with the driving means for continuously oscillating the carriage, a continuously rotating cam mounted on and splined to the cam shaft, means for automatically moving the continuously rotating cam on the cam shaft into engagement with the cam roller to raise the trough and project the pipe into cutting engagement with the saw during an oscillation of the carriage, and means for automatically returning the cam to its normal position out of engagement with the cam roller after the cutting operation.

9. A machine for severing continuously moving pipe or the like into predetermined lengths, comprising a stationary frame, a carriage having a pivoted link connection at each end with the stationary frame, a rotating saw mounted on the carriage, a motor mounted on the stationary frame for continuously rotating the saw, a driving connection between the motor and the saw, driving means for continuously oscillating the carriage, means for adjusting the oscillating stroke of the carriage, a trough pivotally connected to the carriage and adapted to oscillate therewith for supporting the pipe adjacent to the saw, a vertically movable link mounted below and adjacent to the carriage having its upper end pivoted to the movable trough, a cam roller mounted on a shaft in the lower end of the vertically movable link, a housing surrounding the lower end of the vertically movable link, a cam shaft journaled in bearings in the housing adapted to be continuously rotated by a connection with the driving means for continuously oscillating the carriage, a continuously rotating cam member mounted on and splined to the cam shaft, said cam member having a vertically extending main cam and a secondary cam extending laterally therefrom, means for normally holding the main cam out of engagement with the cam roller in the lower end of the vertically movable link with the trough in its lowered position with the pipe out of cutting engagement with the saw during the oscillations of the carriage, means for moving the main cam into engagement with the cam roller to raise the trough and project the pipe into cutting engagement with the saw during an oscillation of the carriage, and a cam roller for engaging the secondary cam for sliding the main cam out of engagement with the cam roller in the lower end of the vertically movable link to lower the trough after the cutting operation.

10. A machine for severing continuously moving pipe or the like into predetermined lengths, comprising a stationary frame, a carriage having a pivoted link connection at each end with the stationary frame, driving means for oscillating the carriage, a saw mounted on the carriage, a motor mounted on the stationary frame for continuously rotating the saw, a driving connection between the motor and the saw, a trough pivotally connected to the carriage and adapted to oscillate therewith for supporting the pipe adjacent to the saw, a vertically movable link mounted below and adjacent to the carriage having its upper end pivoted to the movable trough, a cam roller mounted on a shaft in the lower end of the vertically movable link, a housing surrounding the lower end of the vertically movable link, a cam shaft journaled in bearings in the housing adapted to be continuously rotated by a connection with the driving means for oscillating the carriage, a continuously rotating cam member mounted on and splined to the cam shaft having a grooved collar and a vertically extending main cam and a laterally extending secondary cam, a shaft mounted beneath the cam shaft and extending at right angles thereto, a forked lever secured to said shaft having trunnion projections extending into the groove in the collar of the cam member for moving the main cam into or out of engagement with the cam roller, a bell crank lever secured to said shaft having one arm formed with a pawl, a latch for engaging the pawl for holding the main cam out of engagement with the cam roller in the lower end of the vertically movable link with the trough in its lower position with the pipe normally out of engagement with the saw during the oscillations of the carriage, resilient means for holding the pawl in its latched position, a solenoid adapted to be energized to release the latch from the pawl, resilient means connected to the arm of the bell crank lever for moving the main cam into engagement with the cam roller in the lower end of the vertically movable link to raise the trough and project the pipe into cutting engagement with the saw, and a cam roller for engaging the secondary cam for sliding the main cam out of engagement with the cam roller in the lower end of the vertically movable link after each cutting operation.

11. A machine for severing continuously moving pipe or the like into predetermined lengths, comprising a stationary frame, a carriage having a pivoted link connection at each end with the stationary frame, driving means for oscillating the carriage, a saw mounted on the carriage, a motor mounted on the stationary frame for continuously rotating the saw, a driving connection between the motor and the saw, a movable trough pivotally connected to the carriage and oscillating therewith for supporting the pipe adjacent to the saw in the normal pass line out of cutting engagement with the saw during the oscillation of the carriage, a vertically movable link mounted adjacent to the carriage having its upper end pivoted to the movable trough, a cam roller mounted on a shaft in the lower end of the vertically movable link, a housing surrounding the lower end of the vertically movable link, a cam shaft journaled in bearings in the housing adapted to be continuously rotated by a connection with the motor for oscillating the carriage, a continuously rotating cam mounted on and splined to the cam shaft, a solenoid adapted to be energized for actuating means for moving the cam into engagement with the cam roller to raise the trough and project the pipe into cutting engagement with the saw, and means for sliding the cam out of engagement with the cam roller after each cutting operation.

12. A machine for severing continuously moving pipe or the like into lengths successively, comprising a stationary frame, a carriage having a link pivoted at its lower end to the carriage and its upper end to the stationary frame for supporting one end of the carriage, a rocking lever having its lower end pivoted to the carriage and its upper end to the stationary frame for supporting the other end of the carriage, a motor mounted adjacent thereto for oscillating the carriage, gearing driven by the motor, a screw threaded rod journaled in the rocking lever, an adjusting block screw threaded to engage the threaded rod, a pitman rod connecting the driven gearing directly with the adjusting block, means for rotating the threaded rod to raise or lower the adjusting block to vary the oscillating stroke of the carriage, a saw mounted on the carriage, a motor supported on the stationary frame for continuously rotating the saw, a driving connection between the motor and the saw, a trough pivotally connected to the carriage and adapted to oscillate therewith for supporting the pipe adjacent to the saw, a vertically movable link mounted adjacent to the carriage having its upper end pivoted to the movable trough, a cam roller mounted on a shaft in the lower end of the vertically movable link, a housing surrounding the lower end of the vertically movable link, a cam shaft journaled in bearings in the housing adapted to be continuously rotated by a connection with the motor for oscillating the carriage, a continuously rotating cam member mounted on and splined to the cam shaft having a vertically extending main cam and a laterally extending secondary cam, a solenoid adapted to be energized for actuating means for moving the main cam into engagement with the cam roller to raise the trough and project the pipe into cutting engagement with the saw, and a cam roller for engaging the secondary cam for sliding the main cam out of engagement with the cam roller in the lower end of the vertically movable link after the cutting operation.

TOM WILSON.
LAWRENCE J. HESS.

REFERENCES CITED

The following references are of record in the file of this patent:

UNITED STATES PATENTS

| Number | Name | Date |
|---|---|---|
| De. 98,512 | Hammerstadt | Feb. 11, 1936 |
| 558,646 | Hardie | Apr. 21, 1896 |
| 790,099 | Bath | May 16, 1905 |
| 1,198,797 | Waterman | Sept. 19, 1916 |
| 1,606,308 | Lund | Nov. 9, 1926 |
| 1,935,877 | Hammerstadt | Nov. 21, 1933 |
| 1,944,718 | Rafter | Jan. 23, 1934 |
| 2,209,995 | Morris | Aug. 6, 1940 |
| 2,416,653 | Stevens et al. | Feb. 25, 1947 |
| 2,452,343 | Wilson | Oct. 26, 1948 |
| 2,473,559 | Anderson | June 21, 1949 |

FOREIGN PATENTS

| Number | Country | Date |
|---|---|---|
| 471,104 | Great Britain | Aug. 23, 1939 |